United States Patent [19]
Venkatesan et al.

[11] Patent Number: 6,091,819
[45] Date of Patent: Jul. 18, 2000

[54] ACCELERATING PUBLIC-KEY CRYPTOGRAPHY BY PRECOMPUTING RANDOMLY GENERATED PAIRS

[75] Inventors: Ramarathnam Venkatesan, Redmond, Wash.; Victor Boyko, Cambridge, Mass.

[73] Assignee: Telcordia Technologies, Inc., Morristown, N.J.

[21] Appl. No.: 08/912,251

[22] Filed: Aug. 15, 1997

Related U.S. Application Data

[60] Provisional application No. 60/023,954, Aug. 16, 1996.

[51] Int. Cl.$^7$ ........................................................ H04L 9/30
[52] U.S. Cl. ................................. 380/28; 380/30; 713/176
[58] Field of Search ..................... 380/23, 49, 30

[56] References Cited

U.S. PATENT DOCUMENTS

| | | | |
|---|---|---|---|
| 5,583,939 | 12/1996 | Chang et al. | 380/30 |
| 5,787,175 | 7/1998 | Carter | 380/30 |
| 5,790,667 | 8/1998 | Omori et al. | 380/23 |
| 5,805,703 | 9/1998 | Crandall | 380/30 |

OTHER PUBLICATIONS

Bruce Schneier, "Applied Cryptography, Second Edition", text book, pp.: 237–263, 483–494, 510–552, 1996.

Alfred J. Menezes et al, "Handbook of Applied Cryptography", text book, pp.: 294–298, 414–416, 459–460, 484, 515–520, 522–537, 1997.

*Primary Examiner*—Tod R. Swann
*Assistant Examiner*—Jennifer Coombs
*Attorney, Agent, or Firm*—Joseph Giordano

[57] ABSTRACT

Fast methods for generating randomly distributed pairs of keys for use in public-key cryptography use a precomputation step to reduce the online task of discrete exponentiation with long integers. After the precomputation is completed, the online steps required to produce a key pair are reduced to a small number κ (about 16) of modular multiplications with long integers. The key pairs are of the form $(k, g^k)$ or $(k, k^e)$ where the exponentiations are computed modulo a long number p, g and e are fixed integers, and k is randomly distributed modulo ord(g), where ord(g) is the smallest positive integer that satisfies $g^{ord(g)}$ modulo p=1. The complexity of doing the precomputation step is itself about n exponentiation and may be accelerated to the same as two exponentiations, but the precomputation step needs to be done only very infrequently. Under easily achieved conditions, an adversary cannot analyze enough key pairs to gain a significant advantage from the knowledge that the method is being used.

6 Claims, 9 Drawing Sheets

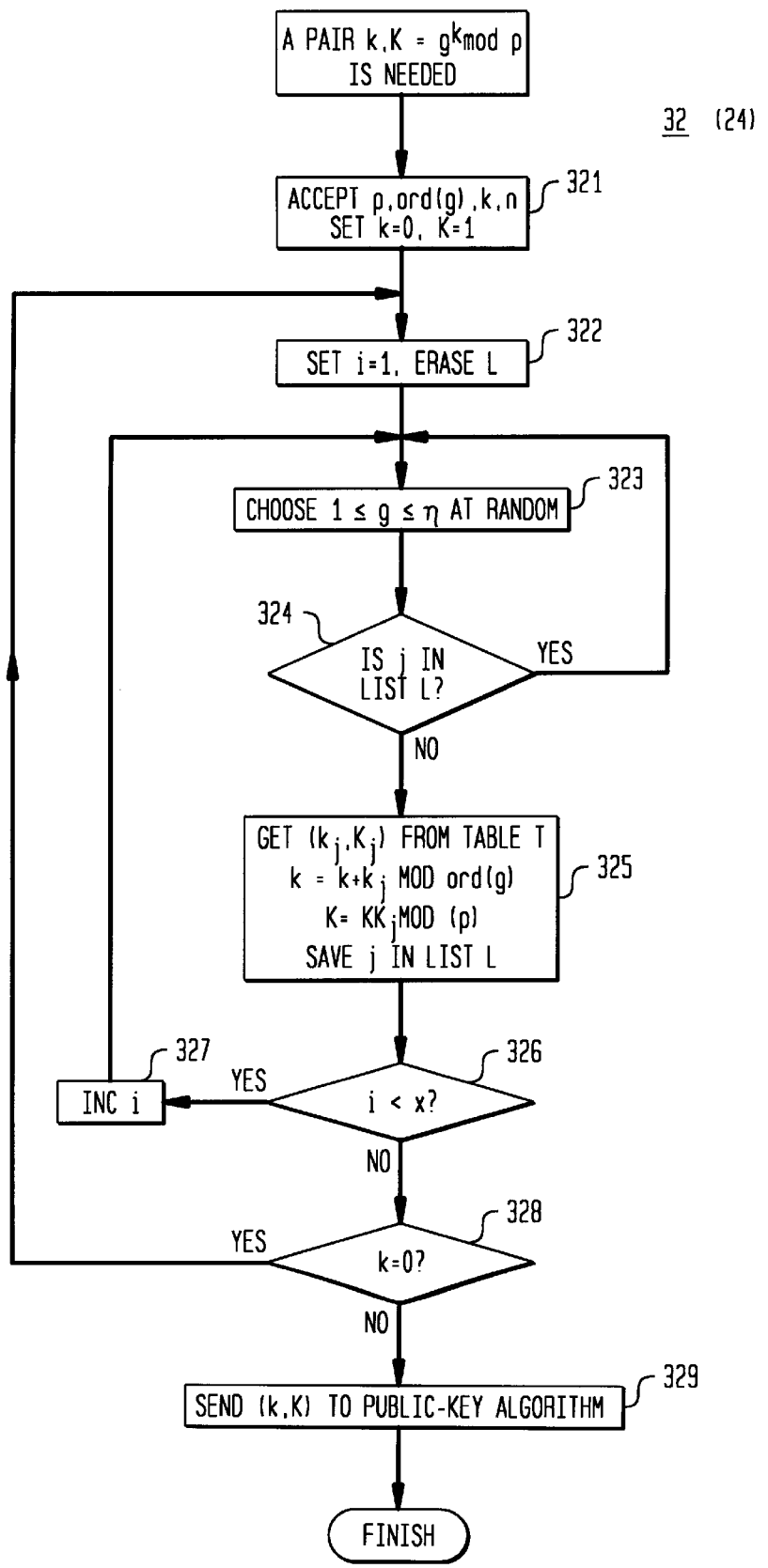

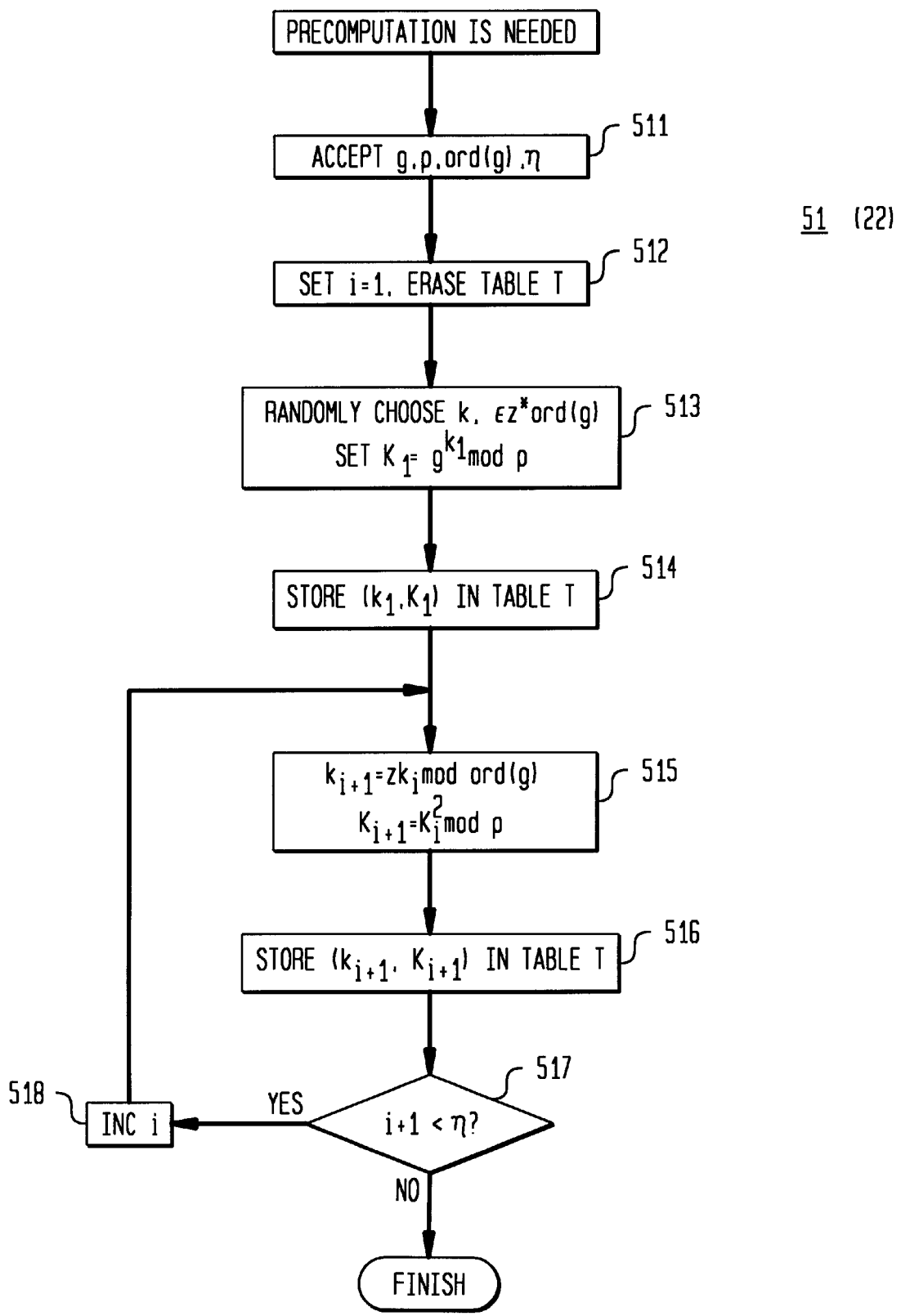

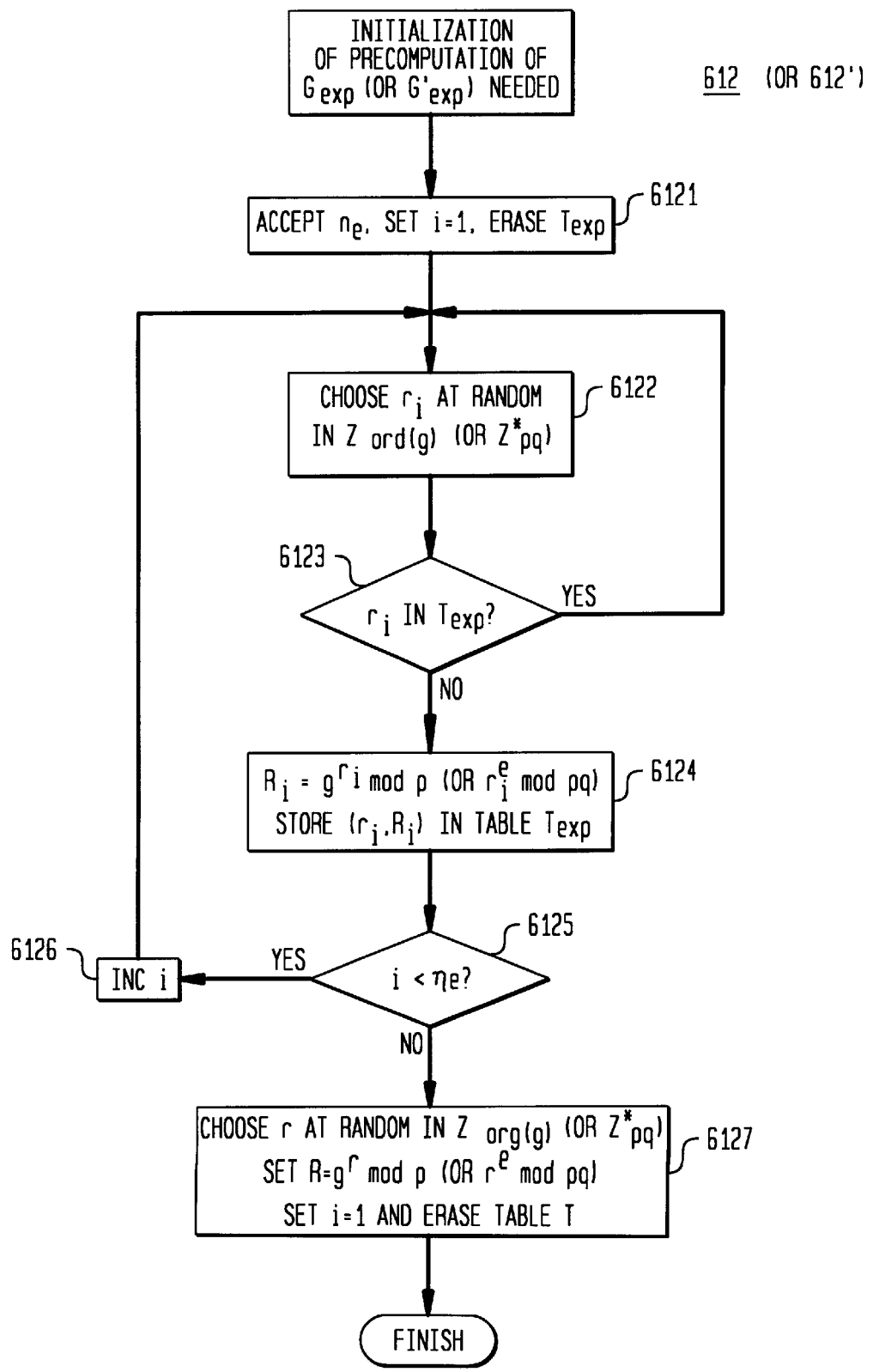

ACCELERATING PUBLIC-KEY CRYPTOGRAPHY BY PRECOMPUTING RANDOMLY GENERATED PAIRS

RELATED APPLICATION

This application claims the benefit of U.S. Provisional Application No. 60/023,954 entitled "Method and System for Generating Randomly Distributed Pairs Using Precomputation" filed Aug. 16, 1996 for Victor Boyko and Ramaranthhnam Venkatesan. The content of this application is incorporated herein by reference.

FIELD OF THE INVENTION

The present invention is directed to a fast method and system for generating randomly distributed pairs of private and public keys for use in certain public-key cryptography systems that depend on the difficulty of calculating discrete logarithms for their security. The inventive method combines a precomputation with fast online steps that calculate the second and subsequent key pairs much faster than other methods.

BACKGROUND OF THE INVENTION

Digital commerce requires digital methods for ensuring that a document does not come from an impostor and that the document has not been altered during delivery. Bruce Schneier has given a comprehensive introduction to the art and science of keeping digital messages secure in his book "Applied Cryptography, Second Edition" published by John Wiley & Sons, Inc., New York (1996).

Some of the schemes that the cryptography community has devised for digital signatures and authentications involve the exponentiation of long integers modulo a public integer that is also hundreds of digits long. The security of these schemes depends on the infeasibility of computing discrete logarithms to learn the secret exponents.

Discrete-log based systems have been widely studied and used in recent decades. Examples include Diffie-Hellman key exchange, ElGamal encryption, ElGamal and DSS signatures, and Schnorr's schemes for authentication and signatures. These schemes require generation of pairs of the form $(k, g^k$ modulo $p)$ where k is randomly distributed modulo on the order of g, p is preferably a positive prime number that is hundreds of digits long, and $g<p$ is another positive integer that may be only a single-digit number. In modular arithmetic, the value of any non-negative integer Q modulo p is the remainder of the division Q/p, and the possible values are the integers in the range $[0, p-1]$.

Usually, g is a generator of p, which means that there exists some integer k such that $y=g^k$ modulo p for each integer y in the set $[1,p-1]$. Because p is preferably prime, g cannot divide it evenly, so 0 and p are not in the set. This set is called $Z^*_p$, and its members form a group with respect to multiplication modulo p. When g is not a generator modulo p, the possible values of $g^k$ modulo p still form a group with respect to multiplication modulo p. That is, the product of any two values $g^k$ and $g^{k'}$ modulo p is equal to $g^{k+k'}$ modulo p, which is also a member of the group. The set of distinct integers forming this group are $1, g, g^2, \ldots, g^{ord(g)-1}$ where $ord(g)$ is shorthand for the order of g in p. Thus k is in the set $[0, ord(g)-1]$, and $g^k$ is a member of $Z_{ord(g)}$. The set $[0, ord(g)-1]$ is also referred to as $Z_{ord(g)}$, and its members form a group with respect to addition modulo $ord(g)$.

A. Diffie-Hellman Key Agreement Protocol

Two parties can use this algorithm to securely establish a secret key by exchanging public keys on an insecure connection. Each party also has a private key, and both of them are able to calculate the same secret key from their own private key and the other party's public key. The parties can then use secret-key cryptographic techniques to exchange further messages securely.

The two Diffie-Hellmann parameters p and g are public. Any two parties Alice and Bob who want to establish a secret key each choose private keys $k_a$ and $k_b$, respectively. Alice computes her public key $g^{k_a}$ modulo p and sends it to Bob, and he computes his public key $g^{k_b}$ modulo p and sends it to her. A third party Eve who copies the two public keys cannot calculate either of the private keys by known methods unless p-1 has only small prime factors. Therefore values of p where p-1 has at least one large prime factor are often used in cryptography. Alice computes the common session key as $(g^{k_b}$ modulo $p)^{k_a}$ modulo p and Bob computes it as $(g^{k_a}$ modulo $p)^{k_b}$ modulo p. A useful result of number theory is that $(g^{k_b}$ modulo $p)^{k_a}$ modulo p is equal to $g^{k_b k_a modulo\ f(p)}$ modulo p, where f(p) is the Euler totient function. The modular arithmetic in the exponent does not depend on the order of $k_a$ and $k_b$, so Alice and Bob compute the same result.

B. ElGamal Encryption

ElGamal encryption also relies on the difficulty of calculating discrete logarithms for its security. Alice can use this algorithm to encrypt a message M in such a way that only Bob can read it. The message M is restricted to be less than p, and all the calculations that follow are to be performed modulo p. Of course, a longer message can be sent in sufficiently many short installments. First, Alice chooses a random number pair k and $g^k$ modulo p as above, but they are not really the key pair. Bob chooses his private key x and calculates his public key $y=g^x$ modulo p. Alice uses Bob's public key y to encrypt M by computing $My^k$ modulo p and sends $e(M, k)=(g^k, My^k)$ to Bob. Bob uses the first part and his secret key x to calculate $(g^k)^x=(g^x)^k=y^k$. Then he divides this result into the second part of the signature that he received from Alice to recover the message M.

C. ElGamal Signatures

To sign a message M, Alice proves to Bob that she used her private key x while only revealing her public key $y=g^x$ modulo p. Alice also chooses a second pair k and $g^k$ modulo p where k must be relatively prime to p-1. This means that the two numbers k and p-1 share no common divisor other than 1. The signature $s(M, k)$ that Alice presents to Bob comprises the two quantities r and s where $r=g^k$ modulo p and $M=(xr+ks)$ modulo $(p-1)$. Alice can solve for s because $k^{-1}$ modulo $(p-1)$ exists when k and p-1 are relatively prime. At this point Alice and Bob know p, g, y, r and s. Of course, Bob also knows the message M that Alice has signed. To verify the signature, Bob checks whether $r^s y^r=g^M$. This turns out to be the case because f(p) is equal to p-1 when p is prime so $r^s y^r$ modulo p is equal to $g^{(xr+ks) modulo (p-1)}$ modulo p.

D. DSS Signatures

In DSS signatures, q is a large prime divisor of p-1, and $g^q=1$ modulo p. Alice chooses a secret key x and publishes $y=g^x$ modulo p. To form a signature $s(M, k)=(r, s)$ of a message M, Alice chooses k and computes $r=(g^k$ modulo $p)$ modulo q and $s=(M+xr)k^{-1}$ modulo q. Bob calculates $((g^M y^r)^{s^{-1}}$ modulo $p)$ modulo q. Using the definition of Alice's public key y allows the term $y^r$ modulo p to be simplified to $(g^x)^r$ modulo $p=g^{xr\ modulo\ f(p)}=g^{xr\ modulo\ q}$ because p is prime, $f(p)=p-1$, xr mod p-1 is xr mod q plus some integer times q, and $g^q=1$. Also $(g^M)^{s-1}$ modulo p=$g^{Ms-1 \bmod q}$ modulo p because $Ms^{-1}$ modulo p-1 is $Ms^{-1}$ modulo q plus some integer times q and $g^q=1$. Thus, if Alice used her private key x and her secret k in evaluating s, Bob should find that $((g^M y^r)^{s-1}$ modulo p) modulo $q=(g^{(M+xr)s-1 \bmod q}$ modulo p) modulo $q=(g^{k \bmod q}$ modulo p) modulo $q=(g^k$ modulo p) modulo q=r.

E. Schnorr Authentication

Authentication schemes allow Alice to prove to Bob that she knows a secret without Bob knowing or learning the secret himself. For example, suppose Bob is a server and the secret is Alice's password. The server does not need to know Alice's password; it only needs to verify that Alice knows it. The security design of the server is much more robust if the passwords are not kept, even in encrypted form.

In Schnorr's authentication scheme, q is a large prime divisor of p-1 and $g^q=1$ modulo p. Alice generates a private key s that is less than q and calculates her public key $v=a^{-s}$ modulo p. When Alice wants to prove that she knows her secret s to Bob, she generates a random $k \in Z^*_q$ and computes $x=g^k$. Alice sends x to Bob, who then picks a random number r between 0 and $2^t-1$ and sends it back to Alice. At this point Alice and Bob both know p, g, q, v, x, and r, but only Alice knows k, and only the real Alice knows s. Alice sends y=(k+sr) modulo q to Bob. Bob computes $g^y v^r = g^{(k+sr) \bmod q} (g^{-s}$ modulo p)$^r$. The product of the exponents is calculated modulo f(p)=p-1, so Bob has $g^{(k+sr) \bmod q} g^{-sr \bmod p-1}$. Because q is a divisor of p-1, -sr modulo p-1 is -sr mod q plus some integer times q, but $g^q=1$, so Bob is left with $g^k$, which he can verify is x. An impostor trying to spoof Bob by guessing some s' would succeed if (s'-s)r modulo q=0.

F. Schnorr Signatures

In Schnorr's signature scheme, q is a large prime divisor of p-1 and $g^q=1$ modulo p. Alice generates a private key s that is less than q and calculates her public key $v=a^{-s}$ modulo p. Thus p, q, g, s and v are defined in the same way as they are in Schnorr authentication. Alice forms a signature s(M, k)=(r, y) where $r=h(g^k, M)$ is a hash function giving a value in the range between 0 and $2^t-1$ and y=(k+sr) modulo q. At this point Alice and Bob both know the message M and p, g, q, v, y and r, but only Alice knows k, and only the real Alice knows s. Bob does not know $g^k$. However, Bob computes $g^y v^r = g^{(k+sr) \bmod q} (g^{-s}$ modulo p)$^r$. The product of the exponents is calculated modulo f(p)=p-1, so Bob has $g^{(k+sr) \bmod q} g^{-sr \bmod p-1}$. Because q is a divisor of p-1, -sr modulo p-1 is -sr mod q plus some integer times q, but $g^q=1$, so Bob is left with $g^k$ if the signature is genuine. He then performs the hash himself to verify that $h(g^k, M)=r$. As with Schnorr authentication, only Alice knows k and only the real Alice knows s. An imposter trying to forge Alice's signature by guessing that her private key is s' would succeed if (s'-s)r modulo q=0.

G. $2^m$th Root Identification Scheme (Shoup Authentication)

Victor Shoup first described this authentication protocol in a paper "On the Security of a Practical Identification Scheme," in Advances in Cryptology: EUROCRYPT'96, Ueli Maurer, editor, volume 1070 of Lecture Notes in Computer Science, pages 344–353, Springer-Verlag, Berlin (1996). The modulus is a product of two randomly selected primes p and q of equal length, and both of them are equal to 3 modulo 4. The public exponent is $e=2^m$. Alice chooses positive integer $a \in Z^*_{pq}$ as her private key and computes $b=^e a$ modulo pq for her public key. When Alice wants to prove that she knows her secret key a to Bob, she chooses positive integer $k \in Z^*_{pq}$ at random, computes $x=k^e$ modulo pq, and sends x to Bob. Bob chooses r at random in [0, e-1] and sends r to Alice. Alice computes $y=ka^r$ modulo pq and sends y to Bob. At this point Alice and Bob know pq and b, x, r and y. Alice knows pq and, if she is the real Alice, she also knows a. Bob computes $y^e=(ka^r$ modulo pq)$^e$ modulo $pq=k^e a^{re \bmod (p-1)(q-1)}$ modulo pq using Euler's totient (p-1)(q-1) for a product of primes p and q. The order of exponentiation can be reversed, so Bob should verify that $y^e=k^e(a^e$ modulo pq)$^r$ modulo pq=xb$^r$ modulo pq. An impostor trying to spoof Bob would be faced with the problem of determining Alice's private key by taking the $e^{th}$ root of b modulo pq. This is hard if factoring pq is hard. Shoup showed that the scheme is even secure against active attacks, if factoring pq is hard. In an active attack, the impostor is free to interact with Bob repeatedly and can depart from the protocol.

State-of-the-art personal computers can typically calculate a public-key pair of the form (k, $g^k$ modulo p) or (k, $^e k$ modulo p) in less than a second. This is tolerable for transactions that are done infrequently, which is likely to be the case in truly "personal" computer applications. However, the personal computer has become a commodity, and high-end PCs are also being used successfully as servers by small Internet service providers. In such applications, the computational load is compounded by the average number of users and will become a bottleneck as secure electronic commerce expands. Therefore, it is the object of the present invention to provide a more efficient method of calculating random key pairs for use with public-key algorithms that are based on the infeasibility of calculating discrete logarithms or factoring a number constructed by multiplying two large primes.

SUMMARY OF THE INVENTION

The exponentiation $g^k$ modulo p used in Diffie-Hellman key generation can be accelerated by a precomputation step. Typically, it takes on the order of (log p)/(log log p) multiplication steps to compute $g^k$ modulo p with a precomputation when k is chosen randomly in [1, p-1]. However, when p is hundreds of digits long, (log p)/(log log p) is still a large number.

The inventive method produces values of k that are uniformly distributed in [1, ord(g)-1] and, after a precomputation, uses the multiplication of only κ<<log p values from a table of n pre-computed exponentials $g^{k_i}$ modulo p. A preferred method according to the present invention is performed in the following manner:

1. Let the modulus be p and let the parameters n, κ be such that (n/k) is sufficiently large.
2. Perform a pre-processing step:
   Generate n random integers $\alpha_i \in Z_{ord(g)}$. Compute $\beta_i = g^{\alpha_i}$ for each i and store the resulting values of $\alpha_i$ and $\beta_i$ in a table.
3. When a pair $(x, g^x)$ is needed, perform on-line steps:
   Randomly generate $S \subset [1,n]$ such that $|S|=\kappa$.
   Let $k = \Sigma_{i \in S} \alpha_i \bmod ord(g)$.
   If k=0 stop and generate S again.
   Let $K = \Pi_{i \in S} \beta_i$ and return (k,K) as the result.

The precomputation performs n modular exponentiations. This method of generating key pairs preserves the security of public-key algorithms in the sense that they cannot be broken when accelerated key pairs are used unless the algorithms can be broken with truly random key pairs. That is, an adversary seeking to compute k from $g^k$ modulo p gains no significant advantage from knowing that the inventive method produced the key pair. A precomputation can also be used with a fast online multiplication of a random subset of the precomputed quantities to generate key pairs for Shoup authentication. This scheme, also known as $2^m$th root identification, uses key pairs of the form (k, $k^e$ modulo pq) where k is randomly distributed over [1, pq−1], p and q are randomly selected primes of equal length, and e is fixed.

The precomputation step can be further accelerated by restricting $g^k$ modulo p to values that are expressible as a product of κ elements from a set of the form [b, $b^2$, $b^4$, ..., $b^{2(n-1)}$]. That is, $g^k$ is computed directly by multiplication only once in the precomputation step. Thereafter each succeeding element can be generated by squaring the preceding one. Thus the precomputation comprises of only one exponentiation and n−1 multiplications.

The online part of the method can also be further accelerated using results from graph theory. A positive integer r<ord(g) is added to k, and the other half of the key pair is multiplied by $g^r$ modulo p. As successive key pairs are evaluated, r is updated in such a way that it randomly walks over the set of values allowed to k. This change adds one multiplication to the computation of a key pair, but the long-term randomness that it introduces allows a smaller value of κ to be used resulting in an overall saving of several multiplications per key pair.

The organization and operation of this invention will be understood from a consideration of the detailed description of illustrative embodiments, which follows, when taken in conjunction with the accompanying drawings.

BRIEF DESCRIPTION OF THE DRAWINGS

FIG. 3B is a flow chart of a method that the online computation module performs when a first embodiment of the system of FIG. 1A computes key pairs of the form (k, $g^k$ modulo p)

FIG. 5 is a flow chart of an accelerated method that the precomputation module performs when a third embodiment of the system of FIG. 1A computes key pairs of the form (k, $g^k$ modulo p).

FIG. 6A is a flow chart of expanded initialization steps of the precomputation module.

DETAILED DESCRIPTION OF THE INVENTION

Overview of the Invention

Figure 1A:
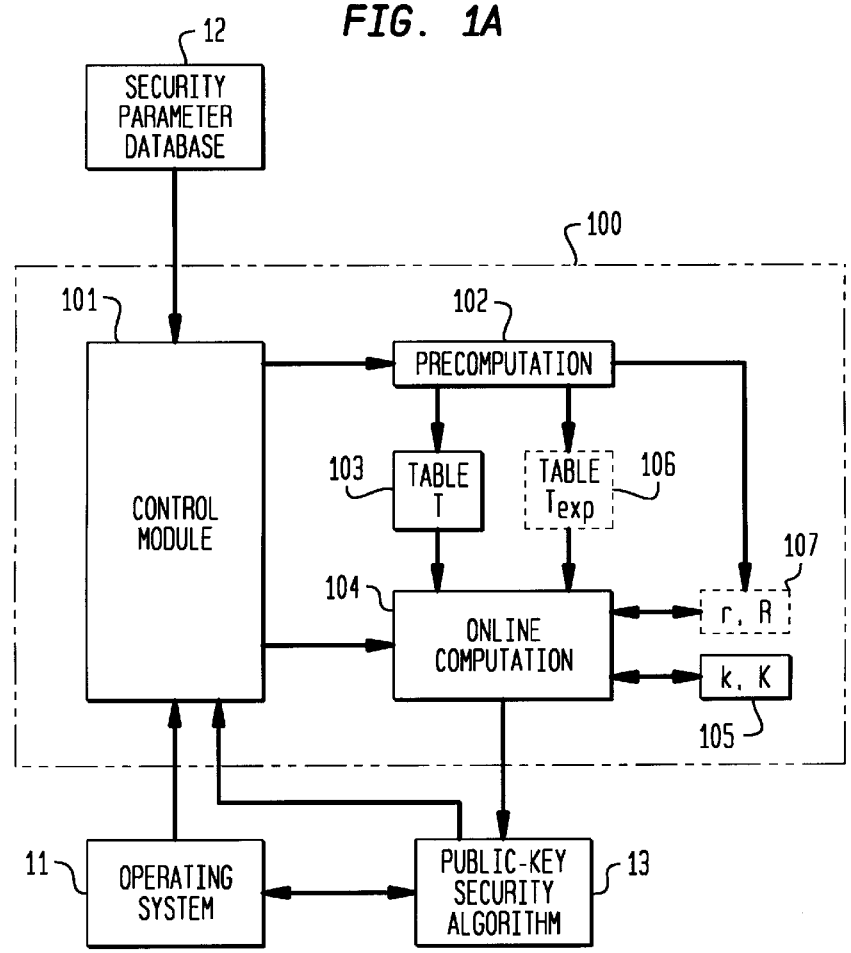
FIG. 1A schematically illustrates a system for generating pairs of private and public keys using precomputation and online computation steps in accordance with the present invention.

FIG. 1A schematically illustrates a device 100 for rapidly generating pairs of private and public keys of the form (k, $g^k$ modulo p) or (k, $k^e$ modulo pq). The system could be implemented in data and software or embedded in special-purpose hardware. The system comprises at least a control module 101, a precomputation module 102, a table of intermediate key pairs 103, an online computation module 104, and temporary storage for a final key pair (k, K) 105. The system may also use a second table $T_{exp}$ 106 and a random key pair (r,R) 107 in an optional security enhancement based on expander graph theory.

The control module accepts commands from an operating system 11 and a public-key security algorithm 13 and reads security parameters from a security parameter database 12. The precomputation module accepts security parameters from the control module, uses the parameters to calculate intermediate key pairs, and stores the intermediate key pairs in tables T and $T_{exp}$. The precomputation module also initializes the random key pair (r, R). On instruction from the control module, the online computation module accepts intermediate key pairs from tables T and $T_{exp}$, updates the random key pair (r,R) and calculates a final key pair (k, K).

On input from the public-key security algorithm, the control module also directs the online computation module to output a final key pair to the public-key security algorithm.

Figure 1B:
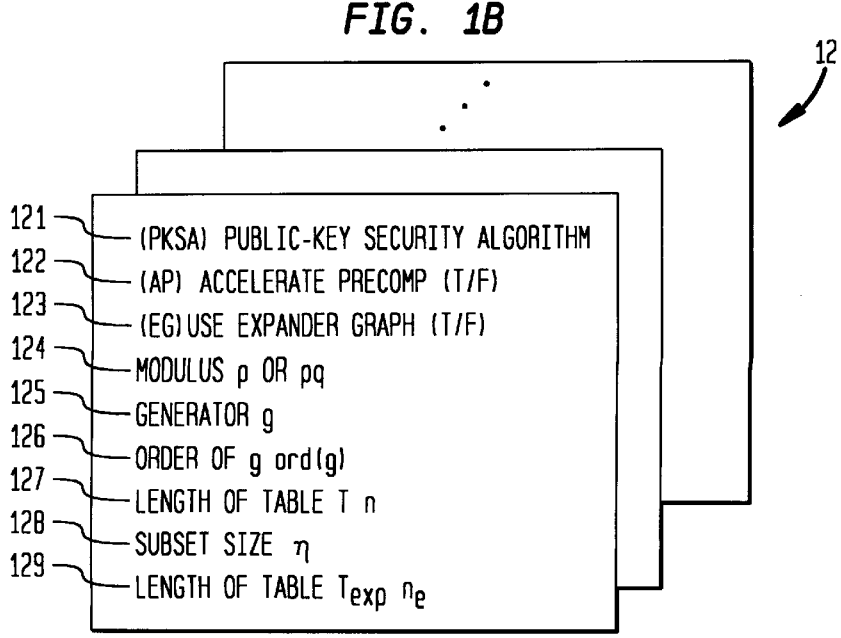
FIG. 1B illustrates the structure of records in a security parameter database that the system uses.

The security parameter database contains a record for each public-key security algorithm, and each record has information in fields as illustrated in FIG. 1B. PKSA 121 identifies the public-key security algorithm 13 that will request key pairs from the system 100. The operation of the precomputation module 102 and the online computation module 104 depend on the public-key security algorithm in various illustrative embodiments described below. AP 122 indicates whether the precomputation module should perform an accelerated precomputation method, and EG 123 indicates whether an expander graph should be used to enhance the security of the final key pairs produced by the system. AP and EG are preferably true/false binary flags. The modulus 124 is indicated by p when it is a prime number and the notation pq is used when the modulus is a product of two primes p and q, preferably of equal length. The algorithms that use a prime modulus p also use a parameter g 125 that is a member of $Z^*_p$. The next parameter ord(g) 126 refers to the number of members of the set 1,g,$g^2$, ..., $g^{ord(g)-1}$, where ord(g) is the smallest positive integer for which $g^{ord(g)}$=1. The length of the table of the intermediate key pairs T 103 is n 127, and k 128 is the size of the subsets of T are used by the online computation module 104. The last parameter is the length $n_e$ of the table $T_{exp}$ 106 of intermediate key pairs that is used in optical security enhancement based on expander graphs.

Figure 2:
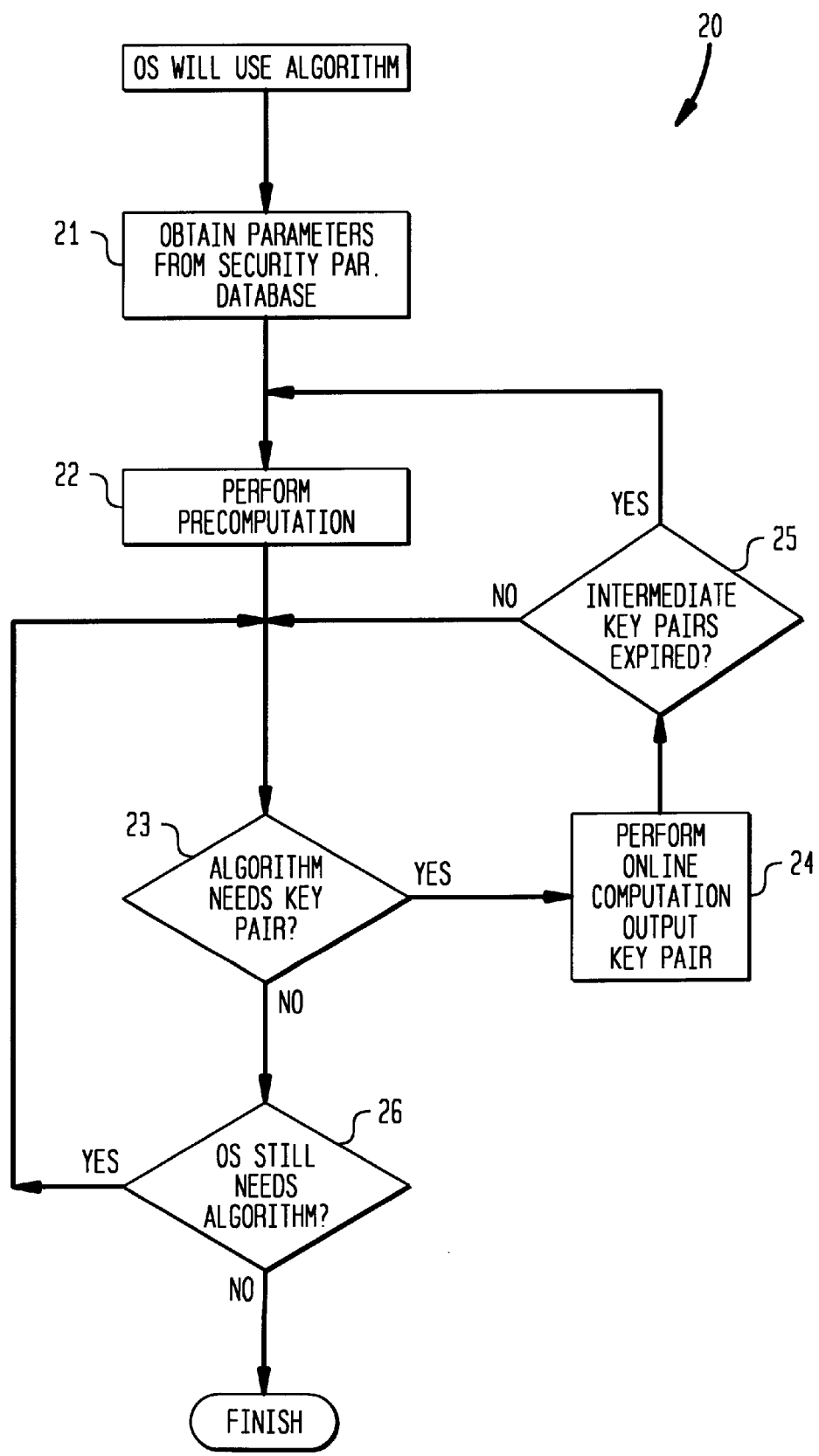
FIG. 2 is a flow chart of a method that the system of FIG. 1A performs in response to a command from an external operating system that a public-key security algorithm is activated.

FIG. 2 illustrates a method 20 that the inventive system 100 performs when the external operating system 11 signals that it will make use of the public-key security algorithm 13. At step 21, the control module 101 obtains security parameters from the security parameter database 12. At step 22, the control module passes these parameters to the precomputation module 102 with a signal to perform the precomputation. At step 23, the control module tests whether the public-key security algorithm has requested a key pair. If the public-key security algorithm has made a request, the control module causes the online computation module 104 to calculate a key pair and output the pair to the public-key security algorithm. After the control module sends the key pair to the public-key security algorithm, it tests, at step 25, whether the intermediate key pairs in table T 103 have expired. If the intermediate key pairs have expired, the control module branches to step 22, where the precomputation is performed again. If the intermediate key pairs have not expired, the control module branches back to step 23, test whether the public-key security algorithm needs another key pair. If the public-key security algorithm does not need a key pair, the control module branches to step 26 and tests whether the external operating system still needs the public-key security algorithm. If the public-key security algorithm is needed, the control module branches back to step 23. If the public-key security algorithm is not needed any longer, the control module waits until the external operating system signals its need to use the public-key security algorithm again.

For a given prime p of length m and g in the set $Z^*_p$, it would take on the order of m modular multiplications to calculate $g^k$ modulo p naively when k is chosen at random modulo p. In a paper entitled "Fast Exponentiation with Precomputation," (Advances in Cryptology: EUROCRYPT '92, Vol. 658 of Lecture Notes in Computer Science, pp. 200–207, E. G. Brickell, Editor, Springer-Verlag, Berlin, 1992) Wilson, et al., showed that it is possible to calculate $g^k$ modulo p for integer k with roughly m/log m steps using precomputation. However, when m is on the order of several hundred or more, m/log m is still large. When pairs of the form ($k,k^e$ modulo pq) are to be calculated with independent values of k chosen at random modulo pq, precomputation is not available, and every pair requires on the order of the length of e modular multiplications.

An adversary cannot use previously generated key pairs to predict a future one when k is chosen at random. However, successive values k need not be completely independent of one another. A more practical requirement is that the sequence of key pairs should not repeat in some large number of iterations on the order of $2^{64}$. After that, the inventive system 100 can be restarted if necessary. The system generates a pair by randomly choosing κ entries from a table of n precomputed values. The number of ways of making one choice is n!/κ!(n−κ)! because the order of the κ entries turns out to be irrelevant. When the system has been used some large number L times, the probability that a repetition will occur is equal to the number of distinct pairs in the run, which is L(L−1)/2, times the constant probability, which is κ!(n−κ)!/n!. Therefore $L^2$ should be on the order of n!/κ!(n−κ)!. Thus, for example, n=$2^8$ and κ=32 will suffice. Cryptologists refer to this kind of calculation as a birthday attack because it accounts for the surprisingly small group of people in which some two people are likely to share the same birthday.

Generating Key Pairs of the Form ($k,K=g^k$ modulo p)

Figure 3A:
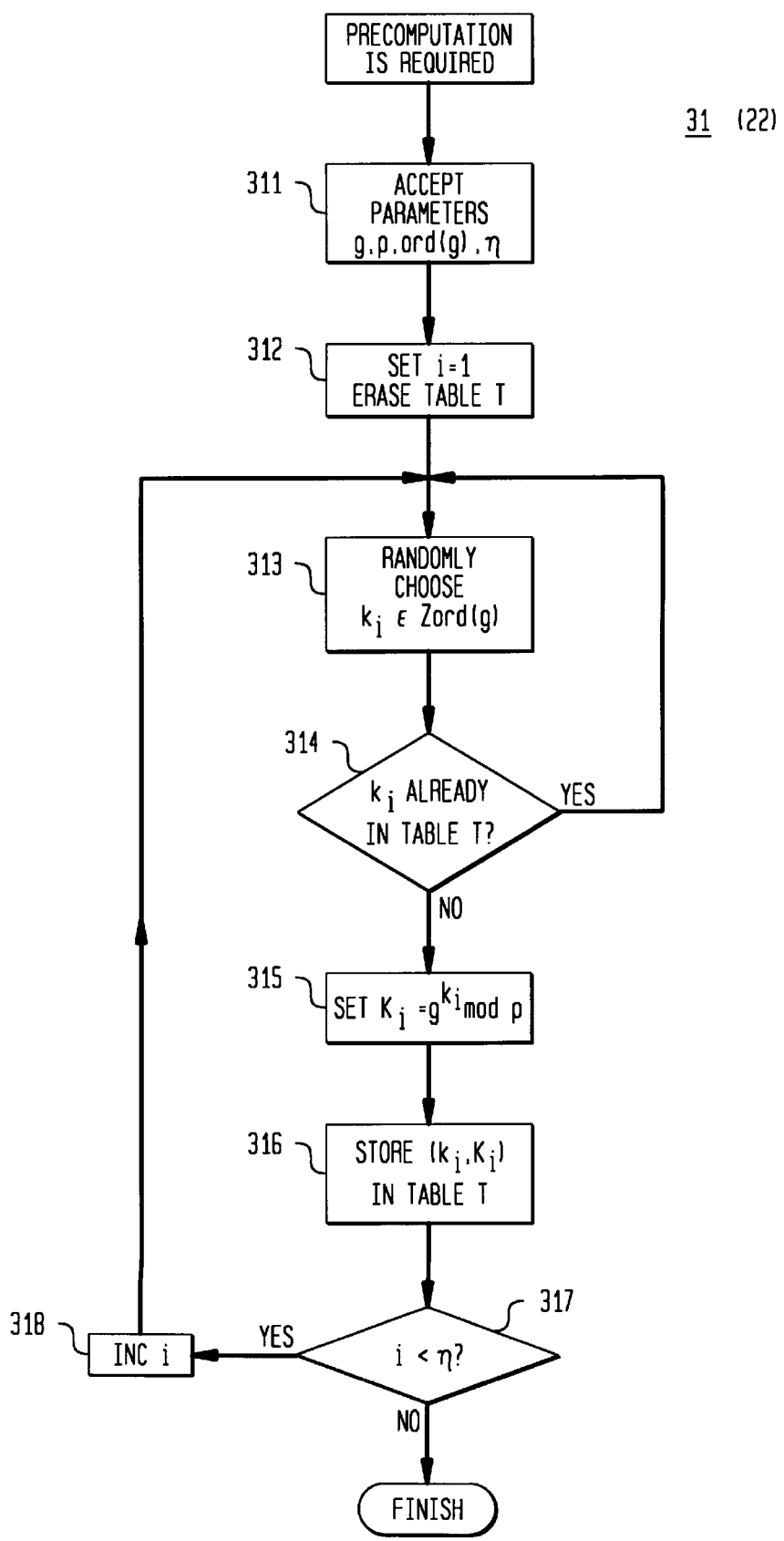
FIG. 3A is a flow chart of a method that the precomputation module performs.

A first illustrative embodiment of a generator G performed by the system 100 and method 20 is discussed in connection with FIGS. 3A and 3B, wherein FIG. 3A illustrates the precomputation step and FIG. 3B illustrates the on-line steps. G uses both a precomputation step and non-random values of k to speed up the generation of key pairs of the form (k, $g^k$ modulo p). This embodiment of G does not use the accelerated precomputation step or the enhancement based on expander graphs (both of which are described below), so AP 122=EG 123=False.

FIG. 3A illustrates a precomputation method 31 performed at step 22 by the precomputation module 102 of G. At step 311, the method accepts positive integers g, p, ord(g) and n, where p is a long prime and ord(g) is the number of distinct results that can be formed by calculating $g^k$ modulo p where k is any positive integer. At step 312 an index i is initialized to 1, and a table T 103 of intermediate key pairs is erased. At step 313 a positive integer $k_i \in Z_{ord(g)}$ is selected at random. At step 314 the method checks table T to see if $k_i$ was previously stored in the first member of a pair. If $k_i$ was previously stored, the method branches back to step 313 and selects another value of $k_i$<ord(g) at random. If $k_i$ is a new value in table T, the method continues to step 315, where a positive integer $K_i$ is set equal to $g^{k_i}$ modulo p. At step 316 the pair of numbers ($k_i$, $K_i$) is stored in a table T. At step 317, the method tests i to determine whether n intermediate key pairs have been generated and stored in table T, and if they have, method 31 is complete. If less than n pairs have been generated and stored, the method branches to step 318, where the index i is incremented by 1. After incrementing i, the method returns to step 313. Thus steps 313 and 318 form a loop that runs until n pairs ($k_i$, $K_i$) have been generated and stored in the table T. When n pairs have been stored, method 31 is complete.

FIG. 3B illustrates an online computation method 32 that is performed at step 24 by the online computation module 104 of G when a key pair (k, K=$g^k$ modulo p) is required by the public-key algorithm 13. At step 321, the method accepts p, ord(g), κ and n, and then it initializes (k, K) to (0, 1). At step 322, the method sets an index i=1 and erases a temporary list L. At step 323 a positive integer j is chosen at random between 1 and n. At step 324 the method checks the temporary list L to see if j was previously stored there. If j was previously stored, the method branches back to step 323 and selects another value of j at random. Steps 323 and 324 thus form a loop that the method runs in until it finds a new value of j. At step 325 j is accepted, and the method retrieves the pair ($k_j$, $K_j$) from the table T 103 of intermediate key pairs. Also at step 325, $k_j$ is added to k modulo ord(g), K is multiplied by $K_j$ modulo p, and j is stored in the temporary table so it will not be selected again. At step 326 i is compared to κ. If i is still less than κ, the method branches to step 327, where i is incremented. After incrementing i, the method returns to step 323 and begins to choose another intermediate key pair ($k_j$, $K_j$). Thus steps 323 to 327 form a loop that the method runs in until it has used κ different intermediate key pairs. When κ intermediate key pairs have been used in the calculation of the key pair (k, K), step 326 branches to step 328 where the method tests whether k is 0. If k is 0, the method branches to step 322. Thus steps 322 to 328 form a loop that the method runs in until it produces a non-zero k. Then the method proceeds to step 329, where the pair is sent to the public-key security algorithm 13, and then method 32 is complete.

Note that K=$g^k$. The preprocessing takes O(mn) multiples. For the on-line steps, each output (x,$g^x$) is computed with only k additions and k multiplications. Note that k=0 only with probability 1/ord (g).

Generating Key Pairs of the Form (k, K=$k^e$ modulo pq)

Figure 4A:
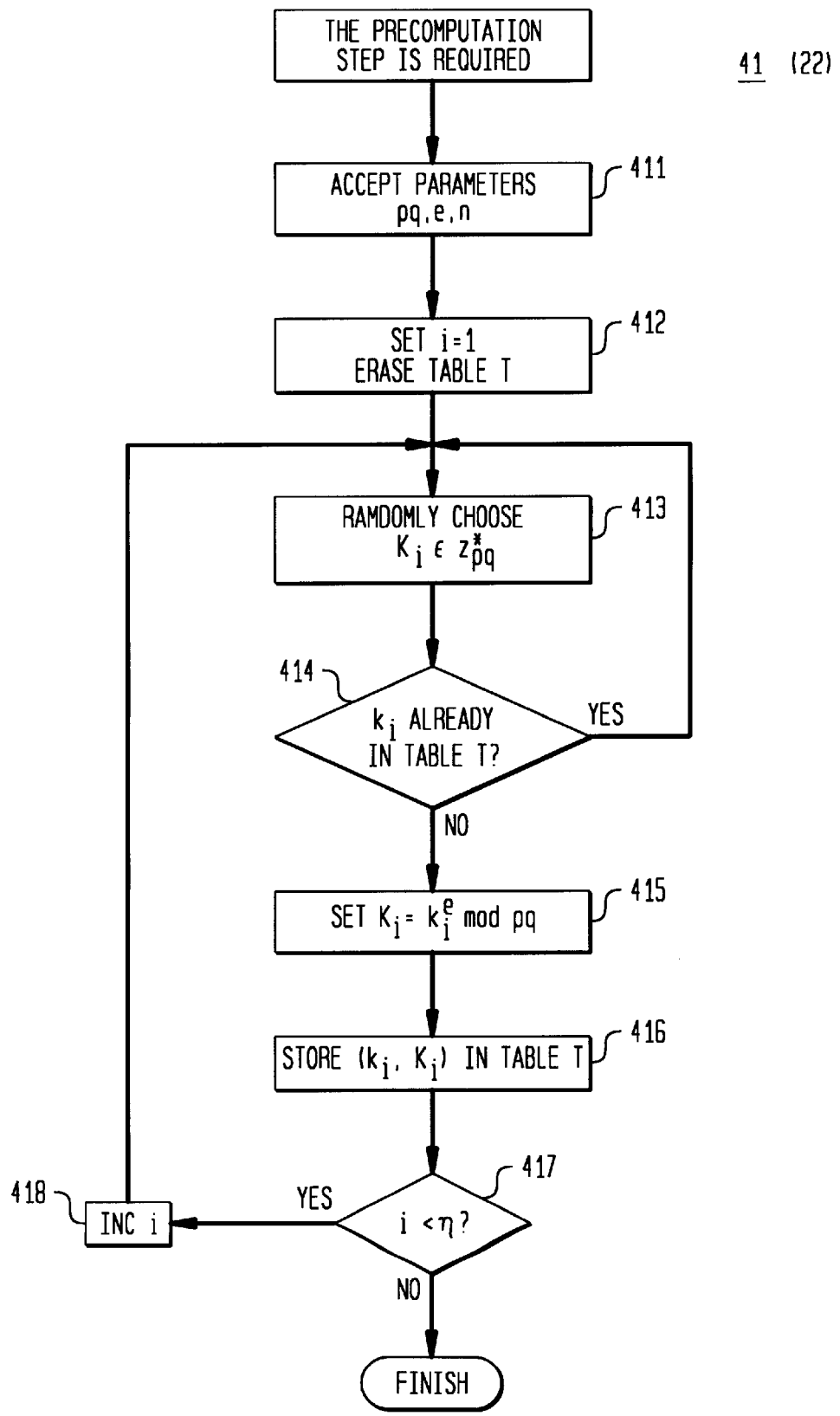
FIG. 4A is a flow chart of a method that the precomputation module performs.
Figure 4B:
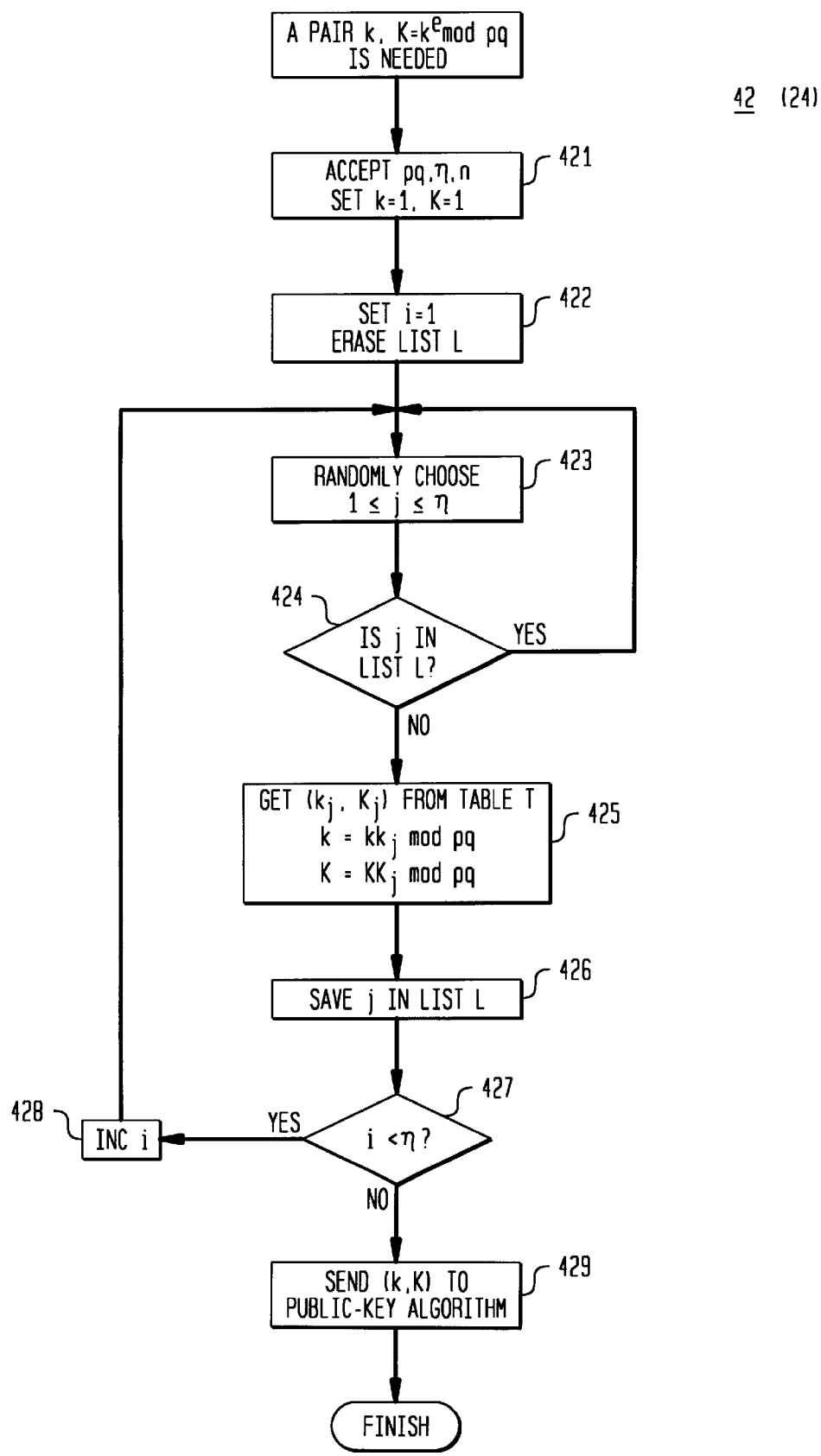
FIG. 4B is a flow chart of a method that the online computation module performs when a second embodiment system of FIG. 1A computes key pairs of the form (k, $k^e$ mod pq).

A second illustrative embodiment G' of the system 100 and method 20 is discussed in connection with FIGS. 4A and 4B, wherein FIG. 4A illustrates the precomputation step and FIG. 4B illustrates the on-line steps. G' uses both a precomputation step and non-random values of k to speed up the generation of key pairs of the form ($k,k^e$ modulo pq) for use in Shoup authentication. The security enhancement based on expander graphs is not used in G' so EG 123 is False, and AP 122 is also False because there is no accelerated precomputation step available for Shoup authentication.

FIG. 4A illustrates a precomputation method 41 performed by the precomputation module 102 of generator G' at step 22 when a precomputation is required. At step 411, the method accepts positive integers pq, e and n, where p and q are primes of equal length, e=$2^m$ for sufficiently large m, and n is the number of values that will be precomputed. At step 412 an index i is initialized to 1, and the table T 103 of intermediate key pairs is erased. At step 413 $k_i \in Z^*_{pq}$ is randomly selected. At step 414 the method checks table T to see if $k_i$ was previously stored in the first member of a pair. If $k_i$ was previously stored, the method branches back to step 413 and selects another value of $k_i$. If $k_i$ is a new value in table T, the method continues to step 415, where $K_i$ is set equal to $k_i^e$ modulo pq. At step 416 the pair of numbers $(k_i, K_i)$ is stored in a table of intermediate key pairs. At step 417, the method tests i to determine whether n pairs have been generated and stored in table T. If less than n pairs have been generated and stored, the method branches to step 418, where the index i is incremented by 1. After incrementing i, the method returns to step 413. Thus steps 413–418 form a loop that runs until n distinct pairs $(k_i, K_i)$ have been generated and stored in the table T. When n pairs have been stored, the method 41 is complete.

FIG. 4B illustrates an online computation method 42 that the online computation module 104 of generator G' performs at step 24 when a key pair of the form $(k, k^e$ modulo pq$)$ is desired by the public-key algorithm 13. At step 421, the method accepts pq, κ and n and initializes (k, K) to (1,1). At step 422, the method sets i=1 and erases temporary list L. At step 423 a positive integer j is chosen between 1 and n at random. At step 424 the method checks the temporary list L to see if j was previously stored there. If j was previously stored, the method branches back to step 423 and selects another value j at random between 1 and n. Steps 423 and 424 thus form a loop that the method runs in until it finds a new value of j. At step 425, the index j is accepted, and the method retrieves the pair $(k_j, K_j)$ from the table T 103 of intermediate key pairs. Also at step 425, k is multiplied by $k_j$ modulo pq and K is multiplied by $K_j$ modulo pq. At step 426, j is stored in the temporary list L so that it will not be selected again. At step 427 i is compared to κ. If i is still less than κ, the method branches to step 428, where i is incremented. After incrementing i, the method returns to step 423 and begins to choose another intermediate key pair $(k_j, K_j)$. Thus steps 423 to 428 form a loop that the method runs until it has used κ different intermediate key pairs. When κ intermediate key pairs have been used in the calculation of the pair (k, K), step 427 branches to step 429 where the method sends the completed key pair to the public-key security algorithm 13 and the method 42 is complete.

Further Accelerating the Precomputation Step

A third embodiment $G_2$ of the system 100 and method 20 is discussed in connection with FIG. 5. $G_2$ is used when the field AP 122 is set to true in the current record of the security parameter database. $G_2$ uses the same online steps 32 as generator G, but the precomputation is different. $G_2$ preferably chooses g and p such that ord(g) is prime.

FIG. 5 illustrates a method 51 that is performed at step 22 by the precomputation module 102 of $G_2$. At step 511, the method accepts positive integers g, p, ord(g) and n, where p is a long prime and ord(g) is the number of distinct results that can be formed by calculating $g^k$ modulo p where k is any positive integer. At step 512 an index i is initialized to 1, and a table T 103 of intermediate key pairs is erased. At step 513, a positive integer $k_1 \in Z^*_{ord(g)}$ is selected at random, and a positive integer $K_1$ is set equal to $g^{k_1}$ modulo p. At step 514, the pair of numbers $(k_1, K_1)$ is stored in a table T. At step 515, the method evaluates $k_{i+1}$ by doubling $k_1$ modulo ord(g) and evaluates $K_{i+1}$ equal by squaring of $K_1$ modulo p. At step 516, the intermediate key pair $k_{i+1}, K_{i+1}$ are stored in table T. At step 517, the method tests i+1 to determine whether n intermediate key pairs have been generated and stored in table T, and if they have, method 51 is complete. If less than n pairs have been generated and stored, the method branches to step 518, where the index i is incremented by 1. After incrementing i, the method returns to step 515. Thus steps 515 to 518 form a loop that runs until n pairs $(k_i, K_i)$ have been generated and stored in the table T. When n pairs have been stored, method 51 is complete.

Method 51 replaces the n modular exponentiations that method 31 uses to evaluate the $K_i$ with just one modular exponentiation and n−1 modular multiplications. Also, only one random selection of an integer in $Z^*_{ord(g)}$ is required in evaluating $k_1$. The remaining $k_i$ are efficiently calculated in a binary computer because multiplication by 2 is accomplished by shifting the bits one position to the left.

Enhanced Security Based on Expander Graphs

Figure 6B:
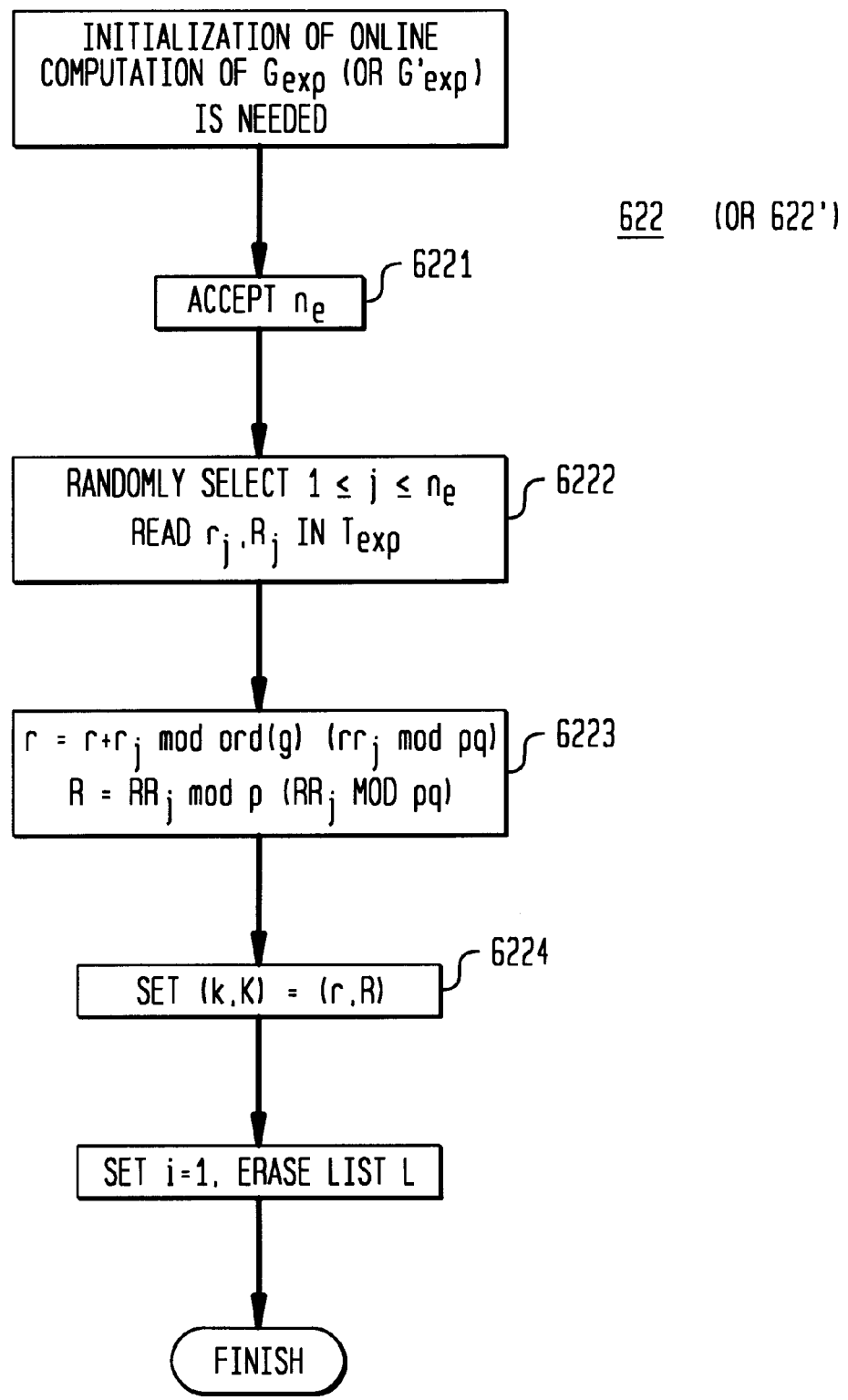
FIG. 6B is a flow chart of expanded initialization steps of the online computation module, in a fourth and fifth embodiments of the system of FIG. 1A.

Security enhancement based on expander graphs is discussed in connection with FIG. 6A for the precomputation steps and FIG. 6B for the online computation steps. These constructions preferably use random walks on Cayley graphs. A Cayley graph $X(Z, S_e)$ of a group Z with respect to a subset $S_e$ of elements of the same group is the graph whose vertices are in one-to-one correspondence with the elements of Z and whose edges are the pairs (z, zs) where z $\in Z$ and $s \in S_e$. With overwhelming probability, $X(Z, S_e)$ is an expander graph, which means that a random walk along its connected edges will arrive at destinations uniformly distributed over Z.

In a fourth (and fifth) embodiment of the system 100 and method 20, a subset of $n_e$ 129 key pairs $(r_i, R_i)$ for i=1,2, . . . , $n_e$ corresponds to S, and a random key pair (r, R) 107 is updated at each online step by combination with an element of S chosen at random. Then the final key pair (k, K) 105 is combined with the randomly walking (r, R). Updating the random key pair (r, R) and combining it with (k, K) adds 2 (or 4) modular multiplications in $G_{exp}$ (or $G'_{exp}$). However, the overall number of modular multiplications in the online computation can be reduced because κ 128 can be reduced by more than 2. Thus the random walk foils the birthday attack in κ!(n−κ)!/n! online computations, where n 127 is the number of intermediate key pairs from which the final pair (k, K) is constructed before combination with (r, R).

The precomputation methods of $G_{exp}$ (or $G'_{exp}$) replace the initialization steps 312 (or 412) respectively with method 612 (or 612'). Except for the expanded initialization step, the precomputation steps of $G_{exp}$ (or $G'_{exp}$) are the same as the steps of the precomputation method in G 31 (or G'41). The modified initialization method 612 (or 612') is illustrated in FIG. 6A. When initialization of the precomputation method of $G_{exp}$ (or $G'_{exp}$) is required, the method begins at step 6121 by accepting parameter $n_e$ 129, which is the number of random key pairs $(r_i, R_i)$ which will be chosen at random and stored in table $T_{exp}$ 106. The method sets an index i=1 and erases $T_{exp}$. At step 6122, the method chooses an element $r_i$ at random from $Z_{ord(g)}$ (or $Z^*_{pq}$). At step 6123, the method checks the table $T_{exp}$ to see if $r_i$ is already stored there. If $r_i$ has already been chosen, the method branches back to step 6122. Thus steps 6122 and 6123 form a loop that the method runs in until an unused $r_i$ is selected. When a new value of $r_i$ has been found, the method branches to step 6124. Here the method calculates $g^{r_i}$ modulo p (or $r_i^e$ modulo pq) and stores the intermediate key pair $(r_i, R_i)$ in table $T_{exp}$. At step 6125, the method test whether $n_e$ pairs have been chosen. If i is still less than $n_e$, the method branches to step 6126, where i is incremented. After incrementing i, the method returns to step 6122. Thus steps 6122 to 6126 form a loop that the method runs in until it stores $n_e$ different pairs $(r_i, R_i)$ in table $T_{exp}$. When $n_e$ pairs have been chosen the method branches to step 6127. At step 6127, the method selects an element r at random from $Z_{ord(g)}$ (or $Z^*_{pq}$), and computes R=$g^r$ modulo p (or $r^e$ modulo pq). The pair (r, R) 107 is the starting point of the random walk that will be generated using the elements of table $T_{exp}$. Finally, i is reset to 1 and table T is erased as in step 312 (or 412), and then the method 612 (or 612') is complete.

The online computation methods of $G_{exp}$ (or $G'_{exp}$) replace the initialization step 322 (or 422) respectively with method 622 (or 622'). Except for the expanded initialization step, the online computation steps of $G_{exp}$ (or $G'_{exp}$) are the same as the steps of the online computation method in G 32 (or G'42). The modified initialization method 622 (or 622') is illustrated in FIG. 6B. When initialization of the online computation method of $G_{exp}$ (or $G'_{exp}$) is desired, the method begins at step 6221 by accepting parameter and $n_e$. At step 6222 a value of j is selected at random in [1, $n_e$] and the pair ($r_j$, $R_j$) is read from table $T_{exp}$. At step 6223, the random pair (r, R) is updated to r+$r_j$ modulo ord (g) (or $rr_j$ modulo pq) and $RR_j$ modulo p (or $RR_j$ modulo pq). This is the random walk step. At step 6224, the method initializes the final key pair (k, K) to (r, R). At step the method sets i=1 and erases list L, which are the operations required in the replaced initialization step 322 (or 422). The method 622 (or 622') is then complete.

Conclusion

In short, methods for generating public key pairs are disclosed which use precomputation and fast on-line steps. The result is an accelerated key generation which permits, for example, personal computers to be used by Internet service providers without becoming a bottleneck for secure commerce.

Finally, the above described embodiments of the invention are intended to be illustrative only. Numerous alternative embodiments may be devised by those skilled in the art without departing from the scope of the following claims.

We claim:

1. A computing device implemented method for rapidly choosing a private key k and determining a public key K=$g^k$ modulo p, where g and p are positive integers, and g and k are less than p, the method comprising:
    (a) performing in a precomputation module precomputation steps of:
        i. choosing integers κ and n such that the number of ways of choosing κ members from a set of n numbers is sufficiently large;
        ii. randomly choosing positive integers $\alpha_i$<ord(g) for i=1, . . . , n,
        iii. for each said integer $\alpha_i$, computing a value $\beta_i$=$g^{\alpha_i}$ modulo p,
        iv. storing said integers $\alpha_i$ and said values $\beta_i$ in pairs ($\alpha_i$, $\beta_i$) in a table, and,
    (b) when a private key k and public key K are desired, performing in an online computation module online steps of:
        i. randomly selecting κ pairs from said table,
        ii. evaluating said private key k as a sum of said integers $\alpha_i$ of said selected pairs, the sum being evaluated modulo ord(g),
        iii. restarting the online steps if the sum is zero, and
        iv. evaluating said public key K as a product of said values $\beta_i$ of said selected pairs, the product being evaluated modulo p.

2. The method of claim 1, wherein the precomputation steps further comprise:
    (a) selecting p to be a prime number;
    (b) the step of randomly choosing $\alpha_i$ for i=1,2, . . . , n further comprising choosing a first integer $\alpha_1$ randomly and selecting subsequent $\alpha_i$ equal to $2^{i-1}$ $\alpha_1$ modulo ord(g) for i=2, . . . , n; and
    (c) the step of computing each successive value of $\beta_i$ for i=2, . . . , n comprising squaring a previous value modulo p.

3. The method of claim 1, wherein:
    (a) the precomputation steps further comprising:
        i. randomly choosing positive integers ri<ord(g) for i=1, . . . , ne and
        ii. precomputing Ri=gri modulo p, where r is an integer,
        iii. storing pairs (ri, Ri) in a second table, randomly choosing a value r and its exponentiation R=gr modulo p from said second table, and
    (b) the online steps further comprising:
        i. randomly choosing a pair (rj, Rj) from said second table,
        ii. replacing r by r+rj modulo ord(g) and R by RRj modulo p, and
        iii. replacing k by k+rj modulo ord(g) and K by RiK modulo p.

4. A computing device implemented method for rapidly choosing an integer k that is less than the product of two long prime integers p and q and evaluating the eth power of k modulo pq, where e is a fixed integer, the method comprising:
    (a) performing in a precomputation module precomputation steps of:
        i. choosing integers κ and n such that the number of ways of choosing κ members from a set of n numbers is sufficiently large,
        ii. choosing a set Z of n random integers $\alpha_i$<pq, and
        iii. computing values $\beta_i$=$\alpha_i^e$ modulo pq and storing said $\alpha_i$ and $\beta_i$ in pairs in a table,
    (b) when a new pair of values k and $k^e$ modulo pq is desired, performing in an online module online steps of:
        i. randomly choosing a subset z of κ members $\alpha_i$ in said set Z,
        ii. evaluating said integer κ by multiplying said selected $\alpha_i$ in said set z modulo pq,
        iii. evaluating said number $k^e$ by multiplying together said precomputed $\beta_i$ in said set z modulo pq.

5. The method of claim 4, wherein the precomputation steps further comprise:
    (a) selecting p to be a prime number;
    (b) the step of randomly choosing $\alpha_i$ for i=1, 2, where g is an integer, further comprises choosing a first integer $\alpha_1$ randomly and selecting subsequent $\alpha_i$ equal to $2^{i-1}$ $\alpha_1$ modulo ord(g) for i=2, where g is an integer; and
    (c) the step of computing each successive value of $\beta_i$ for i=2, where g is an integer comprising squaring a previous value modulo p.

6. The method of claim 4, wherein:
    (a) the precomputation steps further comprising:
        i. randomly choosing positive integers ri<ord(g) for i=1, where g is an integer,
        ii. precomputing Ri=gri modulo p, where r is an integer,
        iii. storing pairs (ri, Ri) in a second table, randomly choosing a value r and its exponentiation R=gr modulo p from said second table, and
    (b) the online steps further comprising:
        i. randomly choosing a pair (rj, Rj) from said second table,
        ii. replacing r by r+rj modulo ord(g) and R by RRj modulo p, and
        iii. replacing k by k+rj modulo ord(g) and K by RiK modulo p.

* * * * *